United States Patent
Kueltzo et al.

(10) Patent No.: US 6,931,705 B2
(45) Date of Patent: Aug. 23, 2005

(54) CYLINDER LINER HAVING MODIFIED COMBUSTION SEAL AND METHOD

(75) Inventors: Steven W. Kueltzo, Aurora, IL (US); Michael S. Sadowski, Elmhurst, IL (US); Charles W. Gills, Des Plaines, IL (US); James R. Zwick, Lemont, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 282 days.

(21) Appl. No.: 10/373,913

(22) Filed: Feb. 25, 2003

(65) Prior Publication Data

US 2003/0221654 A1 Dec. 4, 2003

Related U.S. Application Data

(60) Provisional application No. 60/359,553, filed on Feb. 25, 2002.

(51) Int. Cl.[7] .................................................. B23P 6/00
(52) U.S. Cl. ............................... 29/402.02; 29/402.09; 29/888.3; 277/594
(58) Field of Search .......................... 29/888.3, 402.01, 29/402.02, 402.09, 402.11; 123/193.2, 193.3; 277/593, 594, 601

(56) References Cited

U.S. PATENT DOCUMENTS

| | | | |
|---|---|---|---|
| 3,147,544 A | * | 9/1964 | Connors, Sr. et al. .. 29/888.011 |
| 4,112,907 A | * | 9/1978 | Nikly ....................... 123/193.3 |
| 4,397,472 A | | 8/1983 | Czernik |
| 4,770,133 A | | 9/1988 | Schibalsky |
| 5,039,117 A | | 8/1991 | Gohrlich et al. |
| 5,125,375 A | | 6/1992 | Vuk |
| 5,275,139 A | | 1/1994 | Rosenquist |
| 5,385,354 A | * | 1/1995 | Hagiwara et al. ........... 277/594 |
| 5,427,388 A | | 6/1995 | Ueta |
| 5,517,958 A | | 5/1996 | Iikura |
| 5,577,472 A | | 11/1996 | Banta, III et al. |
| 5,582,415 A | | 12/1996 | Yoshida et al. |
| 5,608,958 A | * | 3/1997 | Stockton .................. 29/402.11 |
| 5,690,342 A | * | 11/1997 | Tanaka et al. .............. 277/594 |
| 5,755,447 A | * | 5/1998 | Hagiwara et al. ........... 277/601 |
| 5,769,430 A | | 6/1998 | Udagawa |
| 5,913,523 A | * | 6/1999 | Selapack .................... 277/632 |
| 5,938,208 A | | 8/1999 | Yoshida et al. |
| 6,027,124 A | | 2/2000 | Ishida et al. |
| 6,058,918 A | | 5/2000 | Noetzlin |
| 6,619,666 B1 | * | 9/2003 | Tanaka et al. .............. 277/601 |
| 6,719,301 B2 | * | 4/2004 | Chen et al. ................. 277/601 |

* cited by examiner

Primary Examiner—Eric Compton
(74) Attorney, Agent, or Firm—Howard & Howard

(57) ABSTRACT

A method of modifying a combustion seal of a diesel engine fitted with a cylinder liner having an annular top sealing ridge which is damaged or mispositioned so as to interrupt the combustion seal is provided. The method includes exposing the sealing ridge and, without removing the liner from the engine, clamping and plastically deforming a combustion seal shim against the sealing ridge to perfect the combustion seal.

9 Claims, 2 Drawing Sheets

CYLINDER LINER HAVING MODIFIED COMBUSTION SEAL AND METHOD

This application claims the benefit of U.S. Provisional Application Ser. No. 60/359,553, filed Feb. 25, 2002.

BACKGROUND OF THE INVENTION

1. Technical Field

This invention relates generally to cylinder liners and particularly to cylinder liners for heavy duty diesel engine applications wherein a combustion seal is maintained between the liners and a metal gasket plates.

2. Related Art

Cylinder liners, typically fabricated of cast iron, are installed in engine blocks of heavy duty diesel engines and are formed on their upper edge with a circumferentially extending step for receiving a steel plate. A circumferentially continuous sealing ridge projects up from the step surfaces and makes contact with the underside of the steel plate with sufficient force and sealing quality to establish a gas-tight seal between the steel plate and liners. The steel plate engages the cylinder head on its opposite side when the head is bolted to the block. The seal between the liners of the cylinders and the plate serving to seal off the combustion chambers.

For various reasons, including improper liner fit and manufacturing tolerances, such a liner may move relative to the block and steel plate during the combustion cycle. Movement of the liner causes the sealing ridge of the liner to wear impairing the ability of the liner to maintain an adequate combustion seal.

In other situations, it may happen that a liner, through improper installation or manufacturing tolerances is set too low in the block such that the sealing ridge of the liner is not clamped with sufficient force by the steel plate to provide an adequate combustion seal. Such a liner is typically formed with an outer flange that fits into an annular recess machined in the block. When installing the liner, a thin, annular shim is typically installed in the recess of the block and engages the underside of the liner flange to position the sealing ridge at the proper elevation for adequate sealing with the steel plate. In the event the shim turns out to be too thin, such that the liner sits too low for proper sealing, the only known present solution to the problem is to remove the liner and install a thicker shim in the recess of the block, after which the liner is reinstalled. This, of course, can be a costly, inconvenient solution to the problem since the liner needs to be removed and reinstalled, which is particularly troublesome if the problem is discovered after an engine has been built.

It is an object of the present invention to provide a solution for modifying the combustion seal of a heavy duty liner that is worn, improperly installed, or otherwise arranged to make insufficient contact with the metal plate to establish a suitable combustion seal without having to remove and replace or reinstall the liner.

SUMMARY OF THE INVENTION

According to one aspect of the invention, an annular shim is installed between the sealing ridge of a liner and an overlying steel plate to effectively extend the height of the sealing ridge for establishing a combustion seal between the liner and plate.

According to a further aspect of the invention, a liner that is installed in an engine block having a damaged or insufficiently tall sealing ridge is fitted with a circumferentially continuous shim between the ridge and plate to make up for the deficiency and material so as to provide a desired combustion seal with an overlying steel plate.

According to a further aspect of the invention, a liner installed in an engine block having a shim between the liner and the block is provided with a shim between the liner and an overlying steel plate.

According to still a further aspect of the invention, a method is provided for modifying the combustion seal of a diesel engine block fitted with a liner having either a damaged or mispositioned seal ridge. The method comprises preparing a thin, metal annular shim and installing the shim over the seal ridge of the liner and clamping the shim between the liner and an overlying steel plate to form a gas-tight combustion seal about the circumference of the liner—all without removing the liner from the block.

BRIEF DESCRIPTION OF THE DRAWINGS

A presently preferred embodiment of the invention is disclosed in the following description and in the accompanying drawings, wherein.

DETAILED DESCRIPTION OF THE PREFERRED EMBODIMENT

Figure 1:
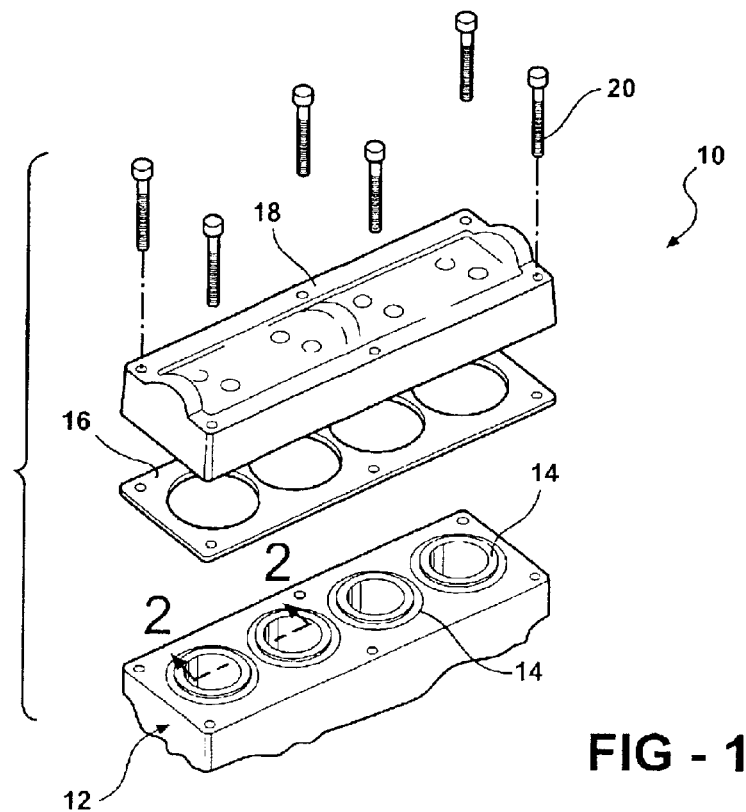
FIG. 1 is a schematic fragmentary perspective view of a diesel engine fitted with cylinder liners.

A schematic representation of a diesel engine fitted with cylinder liners is shown generally at 10 in FIG. 1 and includes an engine block 12 fitted with a plurality of cylinder liners 14, a metal plate gasket 16, and a cylinder head 18 removably mounted to the block 12 by a plurality of fasteners 20 for clamping the plate gasket 16 tightly between the head 18 and liners 14 to establish gas-tight combustion seals around each liner 14 as discussed further below.

Figure 2:
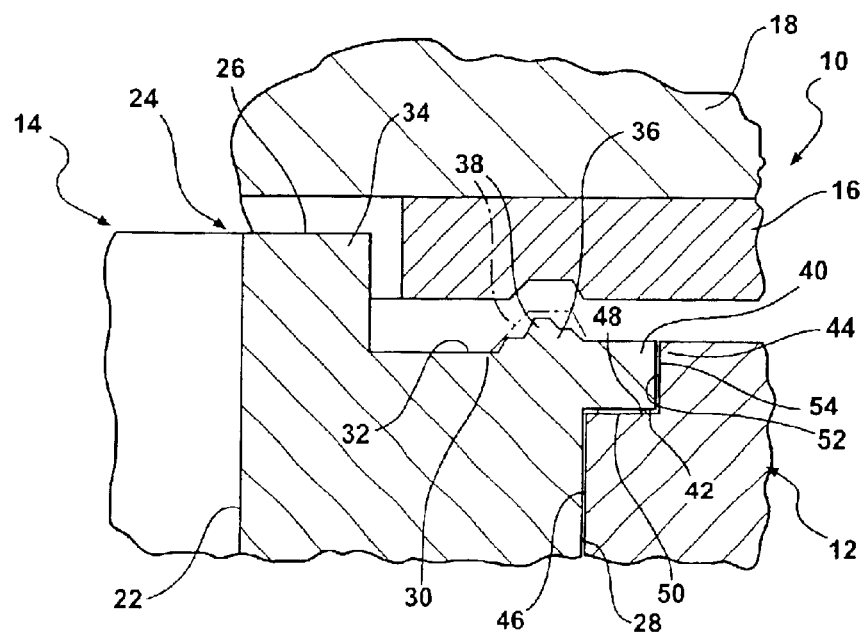
FIG. 2 is an enlarged, fragmentary sectional view taken generally along lines 2—2, shown with the metal gasket plate and cylinder head in place.

FIG. 2 is a greatly enlarged, exaggerated sectional view through a portion of one of the liners 14, showing the manner in which the liner 14 is mounted in the block 12 and how it interacts with the plate gasket 16 and head 18 to provide the gas-tight seal. The liner 14 has an inner cylindrical wall 22 along which a piston (not shown) reciprocates. The inner wall 22 and head 18 define a combustion chamber 24 associated with each liner 14 where combustion of the fuel takes place to drive the piston.

Each cylinder liner 14 has an upper end surface 26, an inner cylinder wall 22 and an outer peripheral surface 28. Spaced radially outwardly from the inner cylinder wall surface 22 is a step 30 formed in the upper surface 26 and extending to the outer surface 28. The step 30 presents a recessed surface 32 which is spaced axially below the upper surface 26. An upstanding, annular fire dam 34 extends above the recessed surface 32, separating the recessed surface 32 from the interior of the liner 14.

Figure 3:
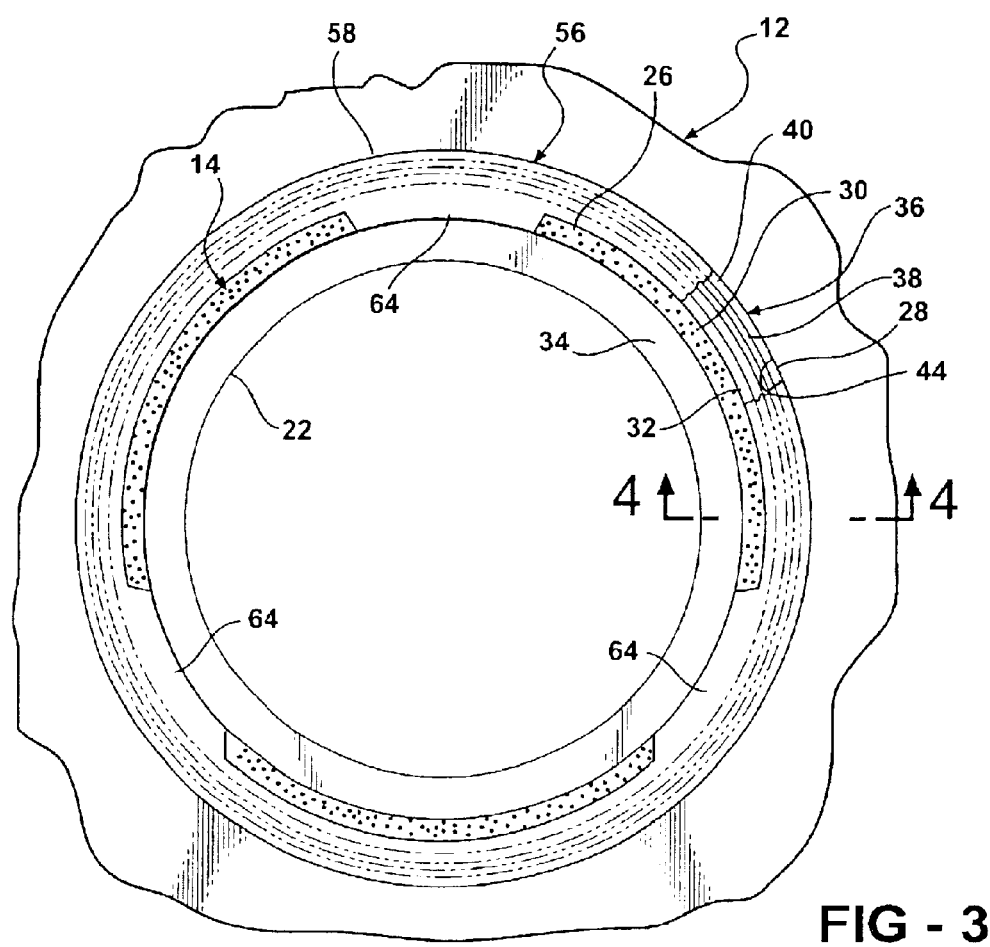
FIG. 3 is an enlarged fragmentary plan view of a liner and shim disposed in a block with the head and plate gasket removed.

Referring additionally to FIG. 3, the annular recessed surface 32 is formed with an annular, axially upwardly projecting sealing ridge 36 that extends about and is spaced outwardly of the fire dam 34. The sealing ridge 36 has an upper annular sealing surface 38 that is preferably flat and planar, as represented by the broken chain line in FIG. 2 but which, for reasons to be explained below, may erode or wear away over time, as represented by solid lines in FIG. 2. The ridge 36 is formed as a one-piece feature with the liner 14. Liners 14 for heavy duty diesel engines are typically cast from iron and features such as the step 34 and sealing ridge 36 are machined into the liners 14.

A mounting flange 40 projects radially outwardly from the sealing ridge 36 and extends about the periphery of the liner 14 at its upper end. The flange 40 has an annular, flat underside mounting surface 42 which fits into a step 44 formed in the block 12 surrounding the cylinder openings 46 in which the liners 14 are installed. The step 44 has an upper annular support surface 48 which underlines the mounting surface 42 of the liners 14.

In a typical installation, it is necessary to carefully locate the sealing surface 38 of the ridge 36 relative to the block 12, such that when the head 18 is bolted to the block 12, the gasket 16 firmly engages the sealing surface 38 with sufficient force and soundness to create a gas-tight seal about the combustion chamber 24 of each liner 14. Typically, a spacer or shim 50 is installed on the block support surface 48 prior to installing the liner 14 in the cylinder opening 46. The shim 50 effectively elevates the mounting surface 42 above the support surface 48, raising the sealing surface 38 of the ridge 36 to a desired level. In some cases, as illustrated in FIG. 2 by the broken chain line, the spacing of the liner-to-block shim 50 is inadequate, such that the gasket 16 does not contact the sealing surface 38 (shown greatly exaggerated in FIG. 2), or if it does contact, not with sufficient force to produce the desired combustion seal. The step 44 in the block 12 has a cylindrical inner wall surface 52 of fixed diameter which, ideally, closely matches the outer diameter of the mounting flange 40 so as to hold the liners 14 against lateral movement relative to the block 12 and gasket plate 16. However, as illustrated in FIG. 2, the wall 52 of the step 44 is sometimes made slightly oversized relative to the outer surface of the flange 40 (or the flange 40 made slightly undersized), such that there exists a radial gap 54 between the flange 40 and step wall 52. The gap 54 permits undesirable lateral movement of the liner relative to the block 12 and plate gasket 16. Such movement typically occurs under load of combustion forces and causes the sealing ridge 36 to rub against the gasket plate 16. Over time, the ridge 36 can erode or wear away such that an adequate combustion seal can no longer be maintained between the liners 14 and the gasket plate 16.

Figure 4:
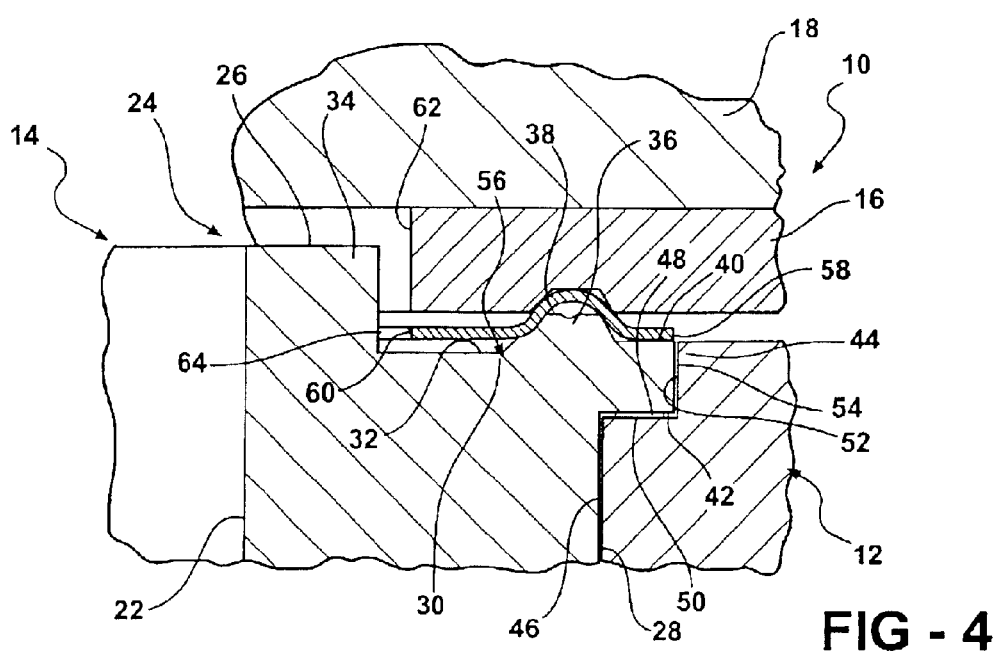
FIG. 4 is an enlarged fragmentary sectional view taken generally along lines 4—4 of FIG. 3 with the head and metal gasket plate in place.

The invention proposes a solution to the problem of an improperly positioned liner (the liner-to-block shim 50 too thin) and/or a worn sealing ridge 36 without having to remove the liner 14 from the block 12 or having to replace the liner 14. According to the invention, the head 18 and gasket plate 16 are removed from the block 12, exposing the liners 14. An annular washer-like combustion seal shim 56 is disposed over the sealing surface 38 of the ridge 36 radially outboard of the fire dam 34 and inwardly from the outer surface 28 as best shown in FIGS. 3 and 4. The combustion seal shim 56 makes up for the inadequate spacing provided by the shim 50 and/or the material of the ridge 36 lost through wear of the ridge 36 so as to restore the sealing capability of the ridge 36 with the gasket plate 16 without having to remove the liner 14 and replace the inadequate shim 50 or rework or replace a liner having a worn ridge 36.

The shim 56 is preferably fabricated of a thin, plastically deformable metal, such as plain carbon steel, heat treatable steel, stainless steel, which may be fully or partially hardened depending upon the requirement of a particular application to provide the desired sealing effect when clamped between the plate 16 and ridge 36. The selection of material and heat treatment (if any) is thus dependent in part on the needs of each application and may vary accordingly as contemplated by this invention. The thickness of the shim 56 may be on the order of 0.001–0.005 inches and preferably on the order of about 0.002 inches. Of course, the thickness will also depend on the requirements of a particular application and the range given here and those of greater range are thus contemplated by this invention.

As illustrated best in FIG. 4, the shim 56 has an outer diameter surface 58 that is about the same diameter as that of the outer diameter of the mounting flange 40 of the liner 14. The shim 56 has an inner diameter surface 60 which is about equal to an inner diameter surface 62 of an opening in the plate 16 surrounding the annular fire dam 34 of the liner 14. The inner diameter surface 60 is spaced from an outer diameter surface of the fire dam 34. A plurality of locating tabs or fingers 64 of the shim 56 project radially inwardly from the inner diameter surface 60 of the shim and are relatively sized to engage the outer diameter surface of the fire dam 34 so as to locate the shim 56 on the liner 14 and support the shim 56 against relative lateral movement on the liner 14. It will be seen from FIG. 4 that a majority of the shim 50 underlies the gasket plate 16, except for the locating tabs 64, and is thereby sheltered from the direct heat of combustion passing over the fire dam 34, protecting the shim 56 against damage or charring from exposure to the heat of combustion.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of modifying a combustion seal of a diesel engine fitted with a cylinder liner having an annular top sealing ridge adapted to be operatively clamped in a sealing position between an engine block and head structure of the engine to provide a circumferentially continuous combustion seal at the sealing ridge, but which sealing ridge is either damaged or mispositioned so as to define a gap at the sealing ridge acting to interrupt the circumferentially continuous combustion seal, said method comprising:

exposing the sealing ridge of the cylinder liner; and without removing the combustion seal cylinder liner from the engine, positioning a shim against the sealing ridge and clamping the combustion seal shim against the sealing ridge to close the gap and perfect the circumferentially continuous combustion seal.

2. The method of claim 1 wherein the head structure includes a cylinder head and a plate gasket, and including positioning the plate gasket between the combustion seal shim and the cylinder head.

3. The method of claim 2 including forming the cylinder liner with a top flange having a top surface and a bottom mounting surface spaced from the top surface and facing an annular support surface of the engine block, and positioning a spacer shim between the mounting surface of the flange and the support surface of the block.

4. The method of claim 1 including forming the cylinder liner with an annular fire dam radially inwardly of the sealing ridge and extending above the sealing ridge.

5. The method of claim 4, including forming the combustion seal shim with a plurality of circumferentially spaced fingers extending toward and locating the combustion seal shim relative to the fire dam.

6. The method of claim 1 including making the combustion seal shim of plastically deformable metal.

7. The method of claim 6 including forming the combustion seal shim with a thickness of between 0.001–0.005 inches.

8. The method of claim 6 wherein the combustion seal shim is formed with a thickness of 0.002 inches.

9. The method of claim 1 including plastically deforming the combustion seal shim against the sealing ridge.

* * * * *